United States Patent [19]

Tosswill

[11] 4,264,824
[45] Apr. 28, 1981

[54] FAR FIELD IMAGING

[75] Inventor: Christopher H. Tosswill, Sturbridge, Mass.

[73] Assignee: Galileo Electro-Optics Corporation, Sturbridge, Mass.

[21] Appl. No.: 95,074

[22] Filed: Nov. 16, 1979

Related U.S. Application Data

[63] Continuation-in-part of Ser. No. 961,671, Nov. 17, 1978.

[51] Int. Cl.³ ............................. G21K 1/00; G01J 1/20
[52] U.S. Cl. .................................. 250/505; 250/203 R
[58] Field of Search .................... 250/336, 505, 363 R, 250/363 S, 366, 203 R

[56] References Cited

U.S. PATENT DOCUMENTS 3,291,988  12/1966  Chope ................................. 250/366
4,205,228  5/1980  Tosswill ............................. 250/505

OTHER PUBLICATIONS

Schmidt, "A Proposed X-Ray Focusing Device with Wide Field of View for Use in X-Ray Astronomy", Nuc. Instr. and Methods, 127 (2), 8-1-75, pp. 285-292.

*Primary Examiner*—Alfred E. Smith
*Assistant Examiner*—Carolyn E. Fields

[57] ABSTRACT

Distant radiation sources are imaged using a collimator having a multiplicity of portions, the transmissivities of the portions to radiation reaching the collimator from a given source being different from portion-to-portion for a given orientation of the collimator, regardless of the distance of the source from the collimator; these transmissivities are varied over time, and radiation passing through each portion is detected for successive values of its transmissivity.

7 Claims, 1 Drawing Figure

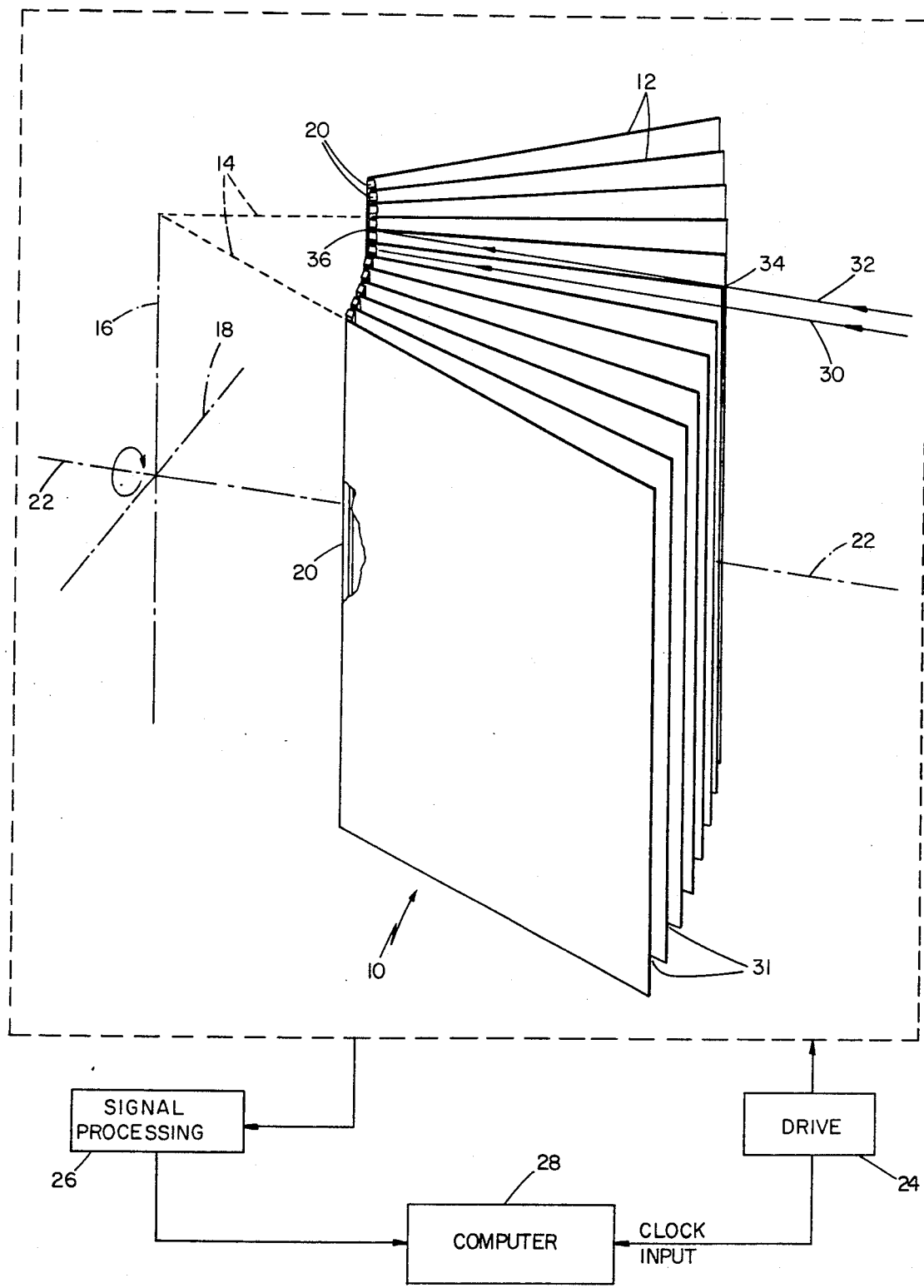

FAR FIELD IMAGING

RELATED APPLICATION

This is a continuation-in-part of my patent application Ser. No. 961,671, filed Nov. 17, 1978, "FAR FIELD IMAGING".

BACKGROUND OF THE INVENTION

This invention relates to obtaining information about radiation sources, and is particularly useful for locating astronomical bodies.

My U.S. Pat. No. 4,090,080 (hereby incorporated by reference) described a device useful for mapping a nearby source ("near field") of radiation, e.g., a gamma ray emittig radioisotope located in a patient undergoing a medical procedure. Each slit of the collimator is defined by a pair of parallel, radiation absorbing sheets. The collimator is rotated about its axis, and detectors are arranged to measure the radiation passing through each slit in each of many angular positions of the collimator. Simultaneous equations are then solved, applying known computer techniques, to generate the desired map.

As is mentioned in said patent, honeycomb-like channel collimators have also been used for such mapping; a single picture is taken with the collimator stationary, each channel viewing a different portion of the source. Channel collimators have also been used in x-ray astronomy, where the source is so distant ("far field") that all channels receive the same radiation flux; the collimator is mounted to pivot about orthogonal axes in a raster scan pattern.

As in the near field case, a major problem in far field imaging with channel collimators is that when the channels are made narrower or longer to improve resolution, sensitivity is reduced and a long time is required for the collimator to transmit enough radiation to assemble an image.

In my pending U.S. patent application Ser. No. 921,200, filed July 8, 1978, now U.S. Pat. No. 4,205,228, (hereby incorporated byreference) there is described a far field imaging device. A collimator is rotated about its own axis while that axis moves about a fixed axis pointing toward the overall field of view of the collimator. Radiation from the source is transmitted through the collimator during each of its revolutions about its axis. The position of the collimator relative to its axis, and the angular position of the collimator axis relative to the fixed axis, at the time of each such transmission, define a response plane. Computerized data reduction is used to find the intersection of the response planes, which will be a line pointing precisely at the source. For multiple sources, there are a corresponding number of intersections.

SUMMARY OF THE INVENTION

My invention provides excellent sensitivity and resolution, with a device of simple construction that requires motion only about a single axis.

In general, the collimator has a multiplicity of portions, the transmissivities of the portions to radiation reaching the collimator from a given source being different from portion-to-portion for a given orientation of the collimator; these transmissivities are varied over time, and radiation passing through each portion is detected for successive values of its transmissivity. In preferred embodiments the collimator has slits defined by radiation absorbing sheets which lie along planes intersecting in a common focal line, and the transmissivities of the slits are varied over time by rotating the collimator about an axis pointing toward its field of view and perpendicular to the focal line.

Other advantages and features of the invention will appear from the following description of a preferred embodiment thereof.

DESCRIPTION OF PREFERRED EMBODIMENT

I turn now to the structure and operation of a preferred embodiment of the invention, after first briefly describing the drawing.

DRAWING

FIG. 1 is a schematic view of the collimator and detectors, with associated elements in block diagram form.

DESCRIPTION

Collimator 10 has spaced, radiation absorbing sheets 12, and may be of the same general construction described in said patent and application. However, sheets 12, rather than being parallel, lie along planes 14 the continuations of which intersect in a common focal axis 16. In a typical preferred embodiment the collimator would have 100 sheets 12, equally angularly spaced to give a total field of view of 10° about axis 16. Sheets 12 extend along axis 16 sufficiently to give about the same 10° field of view about axis 18 perpendicular to axis 16.

A separate detector strip 20, parallel to axis 16, is mounted between the converging ends of each pair of sheets 12. The detectors are of the sort described in said patent.

The collimator and detectors are mounted (using appropriate and conventional hardware, not shown) for oscillation through 180° about an axis 22 perpendicular to axes 16 and 18, under the control of drive unit 24.

Conventional signal processing circuitry 26 is connected to detectors 20 to initially process the information sensed during operation of the device. Computer 28 is provided for data reduction. Stepping motor drive unit 24 provides clock inputs to the computer.

The extent of sheets 12 along planes 14 is such that each central viewing plane 30, bisecting a collimator slit 31, is parallel to the "boundary" viewing plane 32 (which runs between the forward edge 34 of one sheet 12 and the rear edge 36 of the other sheet defining the slit) of an adajacent slit 31.

OPERATION

The instrument is set up by pointing axis 22 at the estimated position of the radiation source to be imaged, e.g., a cellestial body, to bring the source into the overall field of view of the collimator. Drive 24 is turned on and collimator 10 is rotated, in steps, 180° about axis 22. After each step detectors 20 are turned on and readings are taken.

For a given angular position of the collimator about axis 22, radiation from a given source within the field of view will be received primarily through one slit (by its associated detector 20), though there will be some reception through neighboring slits. In other words, the effect of making sheets 12 non-parallel is that, for a given angular position of the collimator, the slits have different transmissivities of radiation from a given source. Rotation of the collimator serves to vary those transmissivities with time. In general, circuitry 26 will note the response of each detector 20 for each angular position of the collimator about axis 22. Data defining these responses, and the angular positions about axis 22 at which they occur, is fed to computer 28. Using a data reduction procedure substantially identical to that described in said patent, angular coordinates (rather than Cartesian coordinates as in the near field case) of each radiation source within the field of view are computed.

Embodiments of the invention using diverging sheets are also useful in near field imaging.

Other embodiments are within the following claims. For example, instead of stepping the collimator, it might be rotated continuously, with the time of arrival of each photon, and the slit through which it arrived, being recorded. Further, the slit-to-slit difference in transmissivity might be achieved other than by angling the sheets, and the variation of transmissivity with time other than by rotating the collimator.

What is claimed is:

1. Apparatus for imaging radiation sources, comprising
    a collimator having a multiplicity of portions transmissive of radiation from a said source,
    the transmissivities of said portions to radiation reaching the collimator from a given said source being different from portion-to-portion for a given orientation of said collimator, regardless of the distance of said source from said collimator
    means for varying said transmissivities over time, and
    means for detecting the radiation passing through each said portion for successive values of its transmissivity,
    wherein said collimator is a slit collimator, the slits of which are defined by spaced, radiation absorbing sheets, and adjacent pairs of said sheets are nonparallel to each other, diverging from each other in the direction away from said means for detecting so as to provide said multiplicity of transmissivities.

2. The apparatus of claim 1 wherein said sheets lie along planes intersecting in a common focal plane.

3. The apparatus of claim 2 wherein corresponding surfaces of each said pair of adjacent sheets have the same included angle.

4. The apparatus of claim 1 wherein the plane bisecting any given slit is parallel to a boundary plane of an adjacent slit, a boundary plane being defined as extending from the forward edge of one sheet to the rear edge of an adjacent sheet.

5. The apparatus of claims 1 or 4 wherein said means for varying said transmissivities comprises means for moving said collimator relative to said source.

6. The apparatus of claim 5 wherein said means for moving comprises means for rotating said collimator about an axis pointing toward the field of view of the collimator.

7. The apparatus of claim 2 wherein said means for varying said transmissivities comprises means for rotating said collimator about an axis perpendicular to said focal line and pointing toward the field of view of the collimator.

* * * * *

UNITED STATES PATENT AND TRADEMARK OFFICE
CERTIFICATE OF CORRECTION

PATENT NO. : 4,264,824
DATED : April 28, 1981
INVENTOR(S) : Christopher H. Tosswill It is certified that error appears in the above-identified patent and that said Letters Patent are hereby corrected as shown below:

Column 4, line 11, "focal plane" should be --focal line--.

Signed and Sealed this

Eleventh Day of August 1981

[SEAL]

*Attest:*

*Attesting Officer*

GERALD J. MOSSINGHOFF

*Commissioner of Patents and Trademarks*